(12) United States Patent
Suzuki et al.

(10) Patent No.: US 11,403,816 B2
(45) Date of Patent: Aug. 2, 2022

(54) THREE-DIMENSIONAL MAP GENERATION SYSTEM, THREE-DIMENSIONAL MAP GENERATION METHOD, AND COMPUTER READABLE MEDIUM

(71) Applicants: Mitsubishi Electric Corporation, Chiyoda-ku (JP); Dynamic Map Platform Co., Ltd., Chuo-ku (JP)

(72) Inventors: Toshiharu Suzuki, Chiyoda-ku (JP); Tsutomu Nakajima, Chuo-ku (JP); Tadashi Ozawa, Chuo-ku (JP)

(73) Assignees: Mitsubishi Electric Corporation, Chiyoda-ku (JP); Dynamic Map Platform Co., Ltd., Chuo-ku (JP)

( * ) Notice: Subject to any disclaimer, the term of this patent is extended or adjusted under 35 U.S.C. 154(b) by 0 days.

(21) Appl. No.: 16/766,460

(22) PCT Filed: Nov. 30, 2018

(86) PCT No.: PCT/JP2018/044152
§ 371 (c)(1),
(2) Date: May 22, 2020

(87) PCT Pub. No.: WO2019/107536
PCT Pub. Date: Jun. 6, 2019

(65) Prior Publication Data
US 2020/0380774 A1 Dec. 3, 2020

(30) Foreign Application Priority Data
Nov. 30, 2017 (JP) .............................. JP2017-229755

(51) Int. Cl.
*G06T 17/05* (2011.01)
*G01C 21/32* (2006.01)
*G06T 17/30* (2006.01)

(52) U.S. Cl.
CPC .............. *G06T 17/05* (2013.01); *G01C 21/32* (2013.01); *G06T 17/30* (2013.01)

(58) Field of Classification Search
CPC .......... G06T 17/05; G06T 17/30; G01C 21/32
See application file for complete search history.

(56) References Cited

U.S. PATENT DOCUMENTS 4,999,789 A * 3/1991 Fiasconaro ............. G06T 17/00
345/427
5,701,404 A * 12/1997 Stevens ................... G06T 17/30
345/419

(Continued)

FOREIGN PATENT DOCUMENTS

CN   109767651 A  *  5/2019
EP   1659367 A1  *  5/2006 ............ B60W 30/09

(Continued)

OTHER PUBLICATIONS

Wang et al., Precise Curvature Estimation by Cooperating with Digital Road Map, Jun. 2008. (Year: 2008).*

(Continued)

*Primary Examiner* — Charles L Beard
(74) *Attorney, Agent, or Firm* — Oblon, McClelland, Maier & Neustadt, L.L.P.

(57) ABSTRACT

A three-dimensional map generation system (500) generates three-dimensional map information (11) by using measured data acquired by a measurement vehicle (200) moving in a measurement area (50). A determination unit (120) determines, from the measurement area (50), a data shortage area where measured data for generating the three-dimensional map falls short, based on first measured data (20) transmitted from the measurement vehicle (200). A generation unit (130) generates interpolated data which interpolates three-dimensional map information of a defective area with a NURBS curve so that a lateral G, which is centrifugal force in a (Continued)

lateral direction applied to a traveling vehicle traveling a road in the defective area at a traveling speed, is equal to or less than a predefined threshold (12).

6 Claims, 12 Drawing Sheets

(56) References Cited

U.S. PATENT DOCUMENTS

| | | | | |
|---|---|---|---|---|
| 5,922,036 | A * | 7/1999 | Yasui | G06V 10/48 |
| | | | | 382/104 |
| 6,236,738 | B1 * | 5/2001 | Zhu | G06T 7/215 |
| | | | | 382/107 |
| 6,334,094 | B1 * | 12/2001 | Hirakata | F02D 41/0097 |
| | | | | 702/145 |
| 8,204,642 | B2 * | 6/2012 | Tanaka | B60W 30/0956 |
| | | | | 382/104 |
| 8,311,283 | B2 * | 11/2012 | Wu | B60W 30/12 |
| | | | | 348/148 |
| 8,676,492 | B2 * | 3/2014 | Litkouhi | G01C 21/26 |
| | | | | 701/409 |
| 8,694,236 | B2 * | 4/2014 | Takagi | G01S 17/931 |
| | | | | 701/300 |
| 8,977,074 | B1 * | 3/2015 | Berent | G06T 19/20 |
| | | | | 382/293 |
| 9,096,411 | B2 * | 8/2015 | Benosman | B66B 7/06 |
| 9,229,453 | B1 * | 1/2016 | Lee | B60W 10/184 |
| 9,383,753 | B1 * | 7/2016 | Templeton | G01S 7/4865 |
| 9,418,302 | B2 * | 8/2016 | Minemura | G06V 20/588 |
| 9,466,143 | B1 * | 10/2016 | Walvoord | G06T 15/00 |
| 9,609,307 | B1 * | 3/2017 | Lopez | H04N 13/128 |
| 9,953,040 | B2 * | 4/2018 | Weese | G16H 30/20 |
| 10,139,244 | B2 * | 11/2018 | Schilling | G08G 1/161 |
| 10,162,354 | B2 * | 12/2018 | Kong | G05D 1/027 |
| 10,776,634 | B2 * | 9/2020 | Meis | G08G 1/167 |
| 10,928,830 | B1 * | 2/2021 | Tran | B60W 30/12 |
| 10,929,692 | B2 * | 2/2021 | Schachter | G06V 20/588 |
| 10,970,924 | B2 * | 4/2021 | Siddiqui | G06T 7/579 |
| 2003/0200005 | A1 * | 10/2003 | Hirai | G05B 19/4103 |
| | | | | 700/187 |
| 2003/0229478 | A1 * | 12/2003 | Rappaport | H04B 17/23 |
| | | | | 703/13 |
| 2005/0253738 | A1 * | 11/2005 | Kobayashi | G01C 21/26 |
| | | | | 340/988 |
| 2006/0097683 | A1 * | 5/2006 | Hosoda | B62D 57/024 |
| | | | | 318/568.12 |
| 2006/0178823 | A1 * | 8/2006 | Eglington | A01B 69/007 |
| | | | | 701/414 |
| 2006/0267978 | A1 * | 11/2006 | Litke | G06T 17/20 |
| | | | | 345/419 |
| 2008/0040035 | A1 * | 2/2008 | Emoto | G01C 21/3638 |
| | | | | 701/436 |
| 2008/0162043 | A1 * | 7/2008 | Emoto | G01C 21/3638 |
| | | | | 701/436 |
| 2009/0190815 | A1 * | 7/2009 | Dam | A61B 5/4514 |
| | | | | 382/128 |
| 2009/0299624 | A1 * | 12/2009 | Denaro | G01C 21/3697 |
| | | | | 707/999.102 |
| 2009/0299630 | A1 * | 12/2009 | Denaro | G06F 16/29 |
| | | | | 707/999.001 |
| 2010/0027861 | A1 * | 2/2010 | Shekhar | G06V 10/755 |
| | | | | 382/128 |
| 2010/0156935 | A1 * | 6/2010 | Lim | G06T 19/20 |
| | | | | 345/647 |
| 2011/0043613 | A1 * | 2/2011 | Rohaly | G06V 20/653 |
| | | | | 348/E13.074 |
| 2011/0125344 | A1 * | 5/2011 | An | G08G 1/096775 |
| | | | | 701/25 |
| 2011/0218724 | A1 * | 9/2011 | Iida | G01C 21/3819 |
| | | | | 701/1 |
| 2012/0084007 | A1 * | 4/2012 | Tran | G01V 11/00 |
| | | | | 702/14 |
| 2012/0095682 | A1 * | 4/2012 | Wilson | G01C 21/32 |
| | | | | 701/532 |
| 2012/0221168 | A1 * | 8/2012 | Zeng | B60W 30/16 |
| | | | | 701/1 |
| 2013/0131925 | A1 * | 5/2013 | Isaji | B60W 30/10 |
| | | | | 701/41 |
| 2013/0131978 | A1 * | 5/2013 | Han | G06T 15/20 |
| | | | | 701/436 |
| 2013/0182108 | A1 * | 7/2013 | Meadow | G06F 16/9537 |
| | | | | 348/143 |
| 2013/0185035 | A1 * | 7/2013 | Andrade | G06T 17/00 |
| | | | | 703/2 |
| 2013/0207973 | A1 * | 8/2013 | Mattila | G06T 13/80 |
| | | | | 345/473 |
| 2014/0019302 | A1 * | 1/2014 | Meadow | G06Q 50/16 |
| | | | | 705/26.61 |
| 2014/0125667 | A1 * | 5/2014 | Praun | G06T 17/05 |
| | | | | 345/426 |
| 2014/0200863 | A1 * | 7/2014 | Kamat | E02F 9/245 |
| | | | | 703/1 |
| 2014/0244125 | A1 * | 8/2014 | Dorum | B60W 40/10 |
| | | | | 701/1 |
| 2014/0267415 | A1 * | 9/2014 | Tang | G06T 11/60 |
| | | | | 345/633 |
| 2015/0032369 | A1 * | 1/2015 | Schmidt | G08G 1/0112 |
| | | | | 701/467 |
| 2015/0153735 | A1 * | 6/2015 | Clarke | B62D 15/025 |
| | | | | 701/301 |
| 2015/0276397 | A1 * | 10/2015 | Michaelis | G01B 21/30 |
| | | | | 702/167 |
| 2016/0012754 | A1 * | 1/2016 | Kishikawa | G09B 29/005 |
| | | | | 434/151 |
| 2016/0045317 | A1 * | 2/2016 | Lang | G05B 19/4099 |
| | | | | 700/98 |
| 2016/0147915 | A1 * | 5/2016 | Pope | G06F 30/13 |
| | | | | 703/1 |
| 2016/0180580 | A1 * | 6/2016 | Lynch | G06T 15/50 |
| | | | | 345/419 |
| 2016/0240107 | A1 * | 8/2016 | Aramaki | G09B 29/10 |
| 2016/0275667 | A1 * | 9/2016 | Modica | G06V 20/176 |
| 2016/0343106 | A1 * | 11/2016 | Hoole | G06F 30/23 |
| 2017/0030722 | A1 * | 2/2017 | Kojo | G01C 21/165 |
| 2017/0066450 | A1 * | 3/2017 | Ko | B62D 15/029 |
| 2017/0089707 | A1 * | 3/2017 | Jehlicka | G01C 21/20 |
| 2017/0135802 | A1 * | 5/2017 | McAlpine | A61B 34/10 |
| 2017/0284812 | A1 * | 10/2017 | Kim | G01C 21/3632 |
| 2017/0294036 | A1 * | 10/2017 | Dorum | G06T 11/203 |
| 2017/0336515 | A1 * | 11/2017 | Hosoya | G01C 21/28 |
| 2017/0363744 | A1 * | 12/2017 | Miya | G01S 19/20 |
| 2018/0025235 | A1 * | 1/2018 | Fridman | H04N 7/18 |
| | | | | 382/103 |
| 2018/0053102 | A1 * | 2/2018 | Martinson | G08G 1/09623 |
| 2018/0056970 | A1 * | 3/2018 | Tokoro | B60W 50/0097 |
| 2018/0068191 | A1 * | 3/2018 | Biemer | G06T 7/11 |
| 2018/0088551 | A1 * | 3/2018 | Pang | G05B 19/4103 |
| 2018/0105174 | A1 * | 4/2018 | Russell | G08G 1/09626 |
| 2018/0158206 | A1 * | 6/2018 | Han | G01C 21/32 |
| 2018/0188026 | A1 * | 7/2018 | Zhang | G06T 7/73 |
| 2018/0188037 | A1 * | 7/2018 | Wheeler | G01C 21/3635 |
| 2018/0188372 | A1 * | 7/2018 | Wheeler | G06K 9/00825 |
| 2018/0188743 | A1 * | 7/2018 | Wheeler | G01C 21/32 |
| 2018/0189323 | A1 * | 7/2018 | Wheeler | G01C 21/00 |
| 2018/0189578 | A1 * | 7/2018 | Yang | G01C 21/32 |
| 2018/0190014 | A1 * | 7/2018 | Yarborough | G01S 7/4808 |
| 2018/0218214 | A1 * | 8/2018 | Pestun | G06K 9/0063 |
| 2018/0232947 | A1 * | 8/2018 | Nehmadi | G01S 7/295 |
| 2018/0238696 | A1 * | 8/2018 | Takeda | G01C 21/3446 |
| 2018/0322623 | A1 * | 11/2018 | Memo | G06T 7/0004 |
| 2018/0342080 | A1 * | 11/2018 | Maddern | G06T 5/40 |
| 2018/0350142 | A1 * | 12/2018 | Maruyama | G06T 19/20 |
| 2019/0023266 | A1 * | 1/2019 | Kouri | G01C 21/32 |
| 2019/0094884 | A1 * | 3/2019 | Aitken | H04W 4/46 |
| 2019/0096057 | A1 * | 3/2019 | Allen | G01N 21/89 |
| 2019/0101934 | A1 * | 4/2019 | Tuukkanen | G05D 1/101 |
| 2019/0111922 | A1 * | 4/2019 | Nath | B60W 30/12 |
| 2019/0138024 | A1 * | 5/2019 | Liang | G06V 20/588 |

(56) References Cited

U.S. PATENT DOCUMENTS

| | | | |
|---|---|---|---|
| 2019/0171912 A1* | 6/2019 | Vallespi-Gonzalez | G06T 7/521 |
| 2019/0180409 A1* | 6/2019 | Moloney | G01C 21/20 |
| 2019/0189006 A1* | 6/2019 | Toma | G08G 1/0968 |
| 2019/0196472 A1* | 6/2019 | Körner | G05D 1/0214 |
| 2019/0204092 A1* | 7/2019 | Wheeler | G05D 1/027 |
| 2019/0226853 A1* | 7/2019 | Kubiak | G01S 13/89 |
| 2019/0251743 A1* | 8/2019 | Koyama | G01C 21/3635 |
| 2019/0271549 A1* | 9/2019 | Zhang | G01C 21/3602 |
| 2019/0271559 A1* | 9/2019 | Colgate | G01C 21/3667 |
| 2019/0302801 A1* | 10/2019 | Zlot | G05D 1/0289 |
| 2019/0318173 A1* | 10/2019 | Kristensen | B60W 30/18009 |
| 2019/0321583 A1* | 10/2019 | Poltorak | A61B 5/486 |
| 2019/0361449 A1* | 11/2019 | Ueno | G08G 1/166 |
| 2019/0383763 A1* | 12/2019 | Yungers | G01N 27/24 |
| 2019/0385361 A1* | 12/2019 | Siddiqui | G06T 17/05 |
| 2019/0392635 A1* | 12/2019 | Ma | G01C 21/367 |
| 2020/0098135 A1* | 3/2020 | Ganjineh | G06T 7/74 |
| 2020/0103250 A1* | 4/2020 | Yashan | G01R 33/09 |
| 2020/0116493 A1* | 4/2020 | Colburn | G06K 9/00476 |
| 2020/0139631 A1* | 5/2020 | Buller | B29C 64/386 |
| 2020/0160598 A1* | 5/2020 | Manivasagam | G07C 5/02 |
| 2020/0193643 A1* | 6/2020 | Hess | G01S 5/0284 |
| 2020/0200547 A1* | 6/2020 | Miller | G08G 1/096805 |
| 2020/0219323 A1* | 7/2020 | Varshney | G06T 19/006 |
| 2020/0226794 A1* | 7/2020 | Sugio | H04N 13/275 |
| 2020/0233424 A1* | 7/2020 | Takahashi | B60W 60/0011 |
| 2020/0272139 A1* | 8/2020 | Rakuff | G05B 23/0254 |
| 2020/0278215 A1* | 9/2020 | Suzuki | G01C 21/3676 |
| 2020/0284590 A1* | 9/2020 | Chen | G01C 21/3819 |
| 2020/0284591 A1* | 9/2020 | Shapira | G06K 9/00805 |
| 2020/0284913 A1* | 9/2020 | Amelot | G01S 7/4808 |
| 2020/0292327 A1* | 9/2020 | Rabel | G01C 21/3819 |
| 2020/0301799 A1* | 9/2020 | Manivasagam | G06T 17/20 |
| 2020/0312042 A1* | 10/2020 | Sardari | G06T 17/00 |
| 2020/0355815 A1* | 11/2020 | Suzuki | G01C 21/3815 |
| 2020/0378802 A1* | 12/2020 | Yashan | G01P 3/481 |
| 2020/0380270 A1* | 12/2020 | Cox | G06K 9/627 |
| 2020/0380271 A1* | 12/2020 | Mittal | G06K 9/6215 |
| 2020/0398750 A1* | 12/2020 | Aizawa | B62J 50/22 |
| 2020/0400441 A1* | 12/2020 | Efland | G01C 21/3697 |
| 2020/0408534 A1* | 12/2020 | Fowe | G06T 7/20 |
| 2020/0410702 A1* | 12/2020 | Zhang | G01S 17/931 |
| 2021/0003404 A1* | 1/2021 | Zeng | G01C 21/30 |
| 2021/0004021 A1* | 1/2021 | Zhang | G06T 7/74 |
| 2021/0004363 A1* | 1/2021 | Bailly | G06F 16/235 |
| 2021/0012538 A1* | 1/2021 | Wang | G06T 9/40 |
| 2021/0027117 A1* | 1/2021 | McGavran | G01C 21/32 |
| 2021/0061304 A1* | 3/2021 | Braunstein | B60W 30/12 |
| 2021/0074159 A1* | 3/2021 | Seo | G08G 1/143 |
| 2021/0092345 A1* | 3/2021 | Graziosi | H04N 19/136 |
| 2021/0101616 A1* | 4/2021 | Hayat | B60W 60/0011 |
| 2021/0108926 A1* | 4/2021 | Tran | G06K 9/00791 |
| 2021/0118217 A1* | 4/2021 | Moloney | G06N 3/04 |
| 2021/0166145 A1* | 6/2021 | Omari | G06N 7/005 |
| 2021/0166474 A1* | 6/2021 | Behar | G06K 9/6259 |
| 2021/0166477 A1* | 6/2021 | Bunkasem | G06K 9/6223 |
| 2021/0191407 A1* | 6/2021 | Benisch | G06N 20/00 |
| 2021/0197720 A1* | 7/2021 | Houston | B60Q 9/008 |
| 2021/0197813 A1* | 7/2021 | Houston | G06N 3/08 |
| 2021/0199442 A1* | 7/2021 | Xie | G01C 21/32 |
| 2021/0199444 A1* | 7/2021 | Xie | G01C 21/3881 |
| 2021/0199755 A1* | 7/2021 | Emadi | G01S 13/931 |
| 2021/0199787 A1* | 7/2021 | Emadi | G01S 13/227 |
| 2021/0200209 A1* | 7/2021 | Mostajeran | G01S 13/44 |
| 2021/0200221 A1* | 7/2021 | Omari | G05D 1/0212 |
| 2021/0200801 A1* | 7/2021 | Agrawal | G06F 16/219 |
| 2021/0201070 A1* | 7/2021 | Omari | G01C 21/3635 |
| 2021/0248514 A1* | 8/2021 | Cella | G06Q 30/0201 |
| 2021/0287430 A1* | 9/2021 | Li | G06T 7/74 |
| 2021/0287536 A1* | 9/2021 | Siltanen | G01C 21/3461 |
| 2021/0293564 A1* | 9/2021 | Deng | G01C 21/3815 |
| 2021/0300410 A1* | 9/2021 | Dorum | B60W 30/18159 |
| 2021/0302968 A1* | 9/2021 | Dorum | G05D 1/0274 |
| 2021/0304462 A1* | 9/2021 | Dorum | G05D 1/0212 |
| 2021/0404834 A1* | 12/2021 | Del Pero | G06V 20/58 |
| 2021/0407186 A1* | 12/2021 | Del Pero | G06T 3/0068 |
| 2022/0012939 A1* | 1/2022 | Wang | G06V 20/647 |
| 2022/0072749 A1* | 3/2022 | Lee | B29C 45/7331 |

FOREIGN PATENT DOCUMENTS

| | | | |
|---|---|---|---|
| EP | 1659367 B1 * | 9/2008 | B60W 30/09 |
| WO | WO-2020085505 A1 * | 4/2020 | B60Q 1/085 |

OTHER PUBLICATIONS

Lee et al., NPL: Robust Multirate On-Road Vehicle Localization for Autonomous Highway Driving Vehicles, Mar. 2017. (Year: 2017).*

International Search Report dated Jan. 29, 2019 in PCT/JP2018/044152 filed Nov. 30, 2018.

"Dynamic Map: Results of Year 2016 and Future Challenges" http://www8.cao.go.jp/cstp/gaiyo/sip/iinkai/jidousoukou_28/siryo28-1-2-1-1.pdf, Mar. 28, 2017, 20 total pages (with English translation).

* cited by examiner

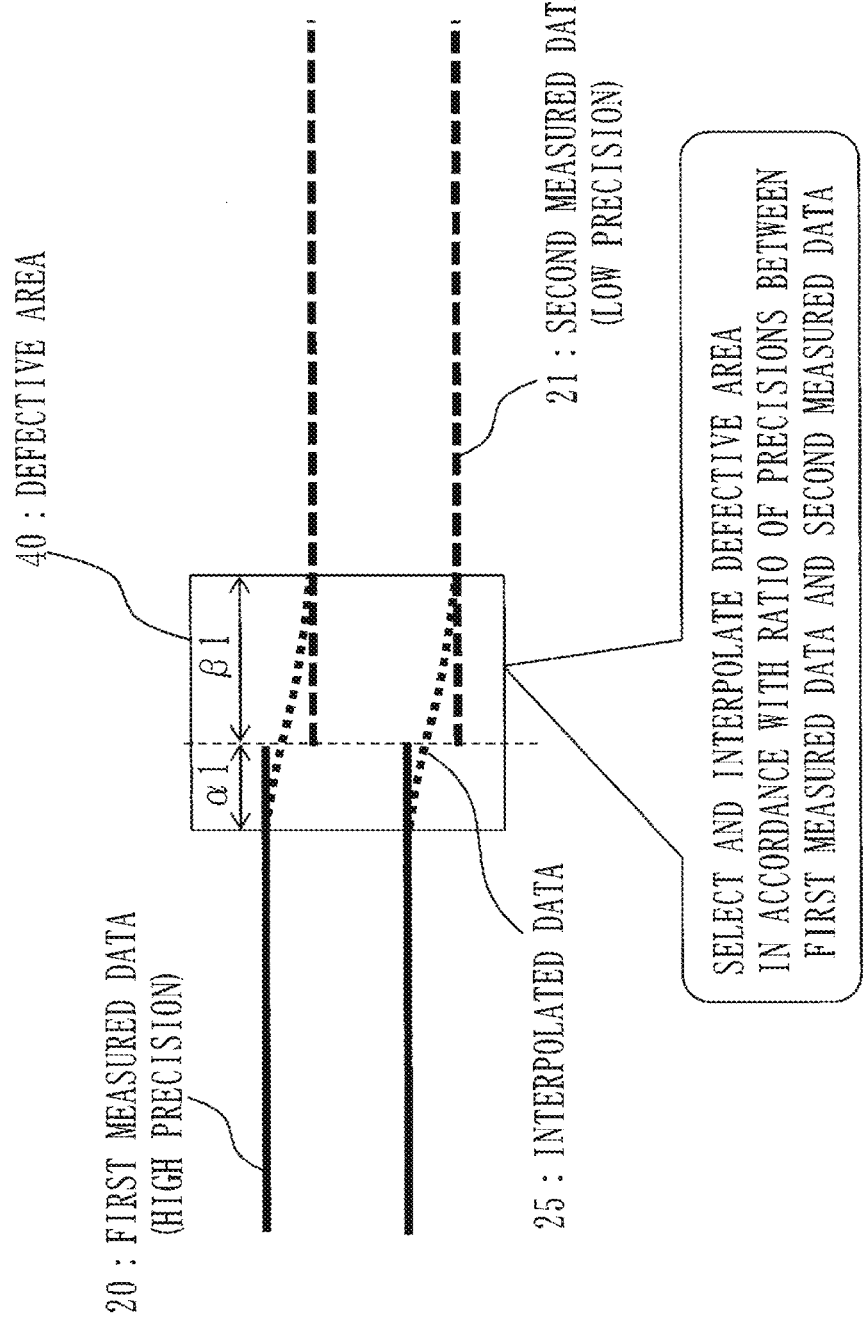

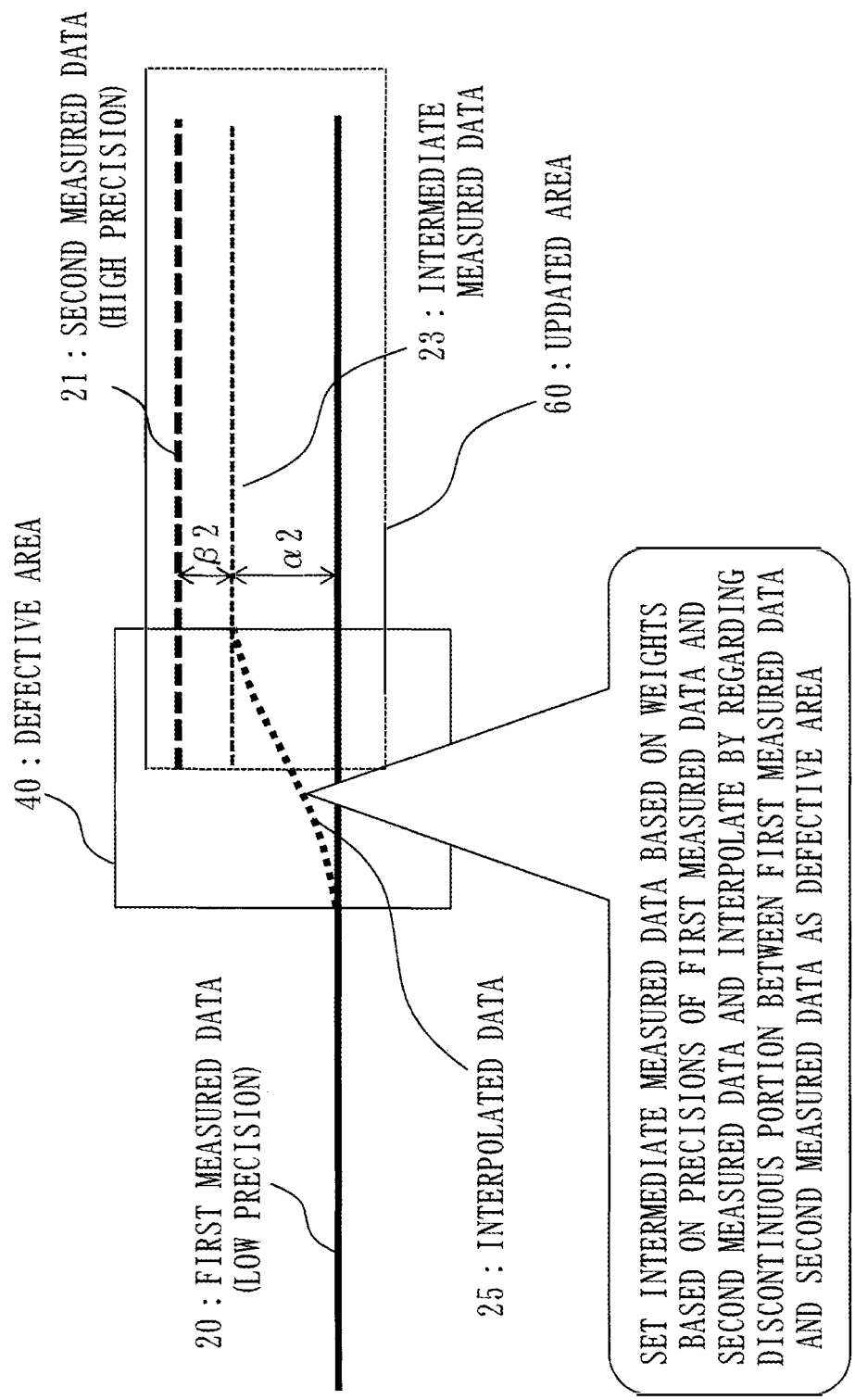

THREE-DIMENSIONAL MAP GENERATION SYSTEM, THREE-DIMENSIONAL MAP GENERATION METHOD, AND COMPUTER READABLE MEDIUM

TECHNICAL FIELD

The present invention relates to three-dimensional map generation systems, three-dimensional map generation devices, three-dimensional map generation methods, and three-dimensional map generation programs of generating a high-precision three-dimensional map. In particular, the present invention relates to a three-dimensional map generation system, three-dimensional map generation device, three-dimensional map generation method, and three-dimensional map generation program of interpolating a portion of shortage of measured data.

BACKGROUND ART

A dynamic map high-precision platform system has been developed for generating a high-precision three-dimensional map, that is, dynamic map, for use in automated driving. The dynamic map high-precision platform system generates a high-precision three-dimensional map, that is, dynamic map, by using three-dimensional point group data measured by an MMS (Mobile Mapping System).

CITATION LIST

Non-Patent Literature

Non-Patent Literature 1: "Dynamic Map: Results of Year 2016 and Future Challenges"
www8.cao.go.jp/cstp/gaiyo/sip/iinkai/jidousoukou_28/siryo28-1-2-1-1.pdf

SUMMARY OF INVENTION

Technical Problem

Under present circumstances, when three-dimensional point group data, which is measured data by the MMS, has an unmeasured location, there is a problem in that a defective area occurs in which three-dimensional point group data is not present in the high-precision three-dimensional map.

An object of the present invention is to provide a three-dimensional map generation system capable of appropriately interpolating a defective area in a high-precision three-dimensional map even if measured data has an unmeasured location.

Solution to Problem

A three-dimensional map generation system according to the present invention, which generates three-dimensional map information representing a three-dimensional map for use in automated driving by using measured data acquired by a measurement vehicle moving in a measurement area, includes:
a determination unit to determine, from the measurement area, a data shortage area where measured data for generating the three-dimensional map falls short, based on first measured data transmitted from the measurement vehicle; and
a generation unit to take the data shortage area as a defective area and to generate interpolated data which interpolates three-dimensional map information of the defective area, wherein
the generation unit generates the interpolated data which interpolates the three-dimensional map information of the defective area with a NURBS (Non-Uniform Rational B-Spline) curve so that a lateral G, which is centrifugal force in a lateral direction applied to a traveling vehicle traveling a road in the defective area at a traveling speed, is equal to or less than a predefined threshold.

Advantageous Effects of Invention

According to the three-dimensional map generation system of the present invention, an effect is provided where even if a defective area where measured data falls short is present in the three-dimensional map, that defective area can be appropriately interpolated.

BRIEF DESCRIPTION OF DRAWINGS

FIG. 11 is a schematic diagram illustrating another example of the interpolation process according to Embodiment 5.
FIG. 12 is a schematic diagram illustrating an example of an interpolation process according to Embodiment 6.

DESCRIPTION OF EMBODIMENTS

Figure 1:
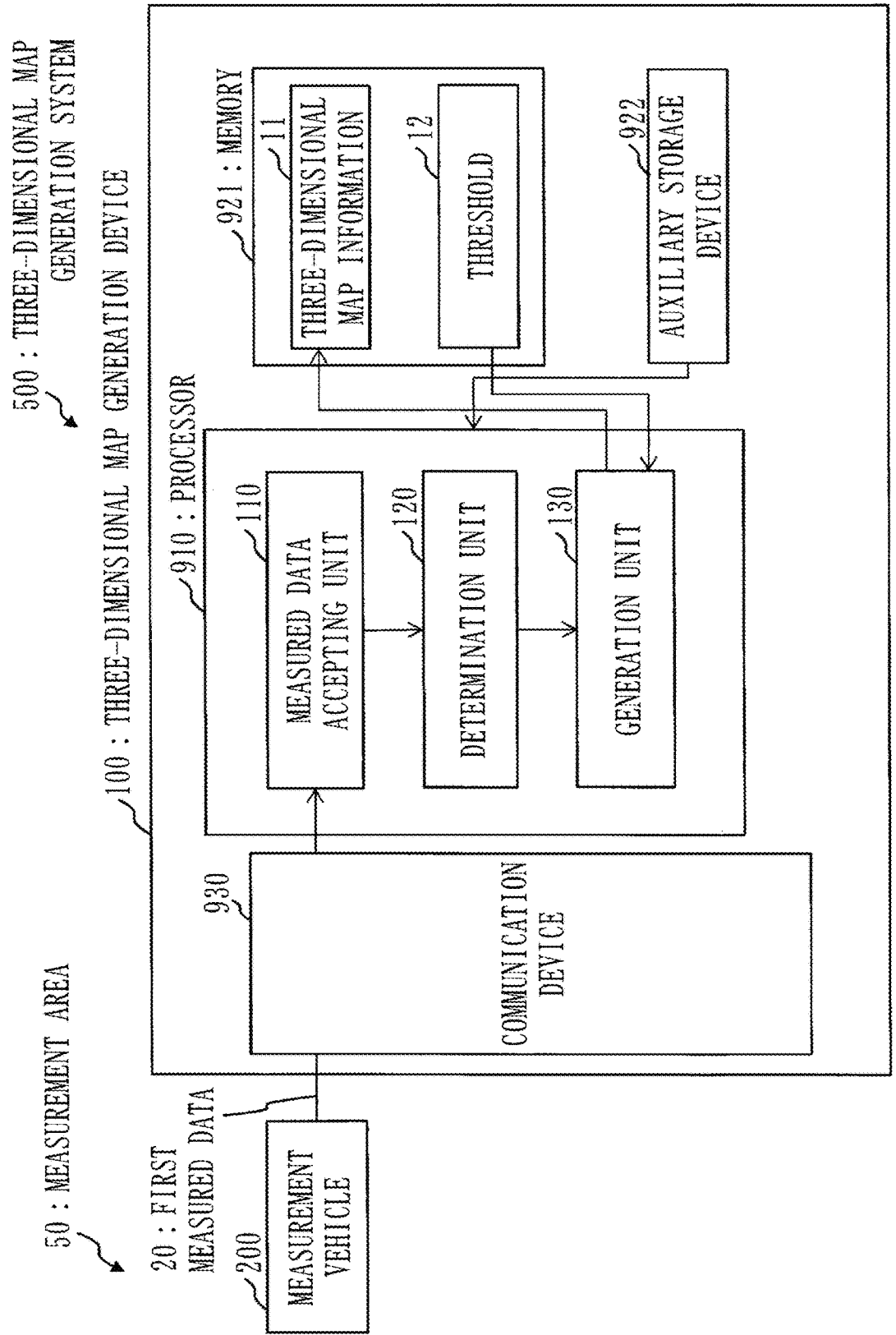
FIG. 1 is a structural diagram of a three-dimensional map generation system and a three-dimensional map generation device according to Embodiment 1.

In the following, embodiments of the present invention are described by using the drawings. Note that, in each drawing, identical or corresponding portions are provided with the same reference characters. In the description of the embodiments, description of the identical or corresponding portions may be omitted or simplified as appropriate.

Embodiment 1

Description of Structure

FIG. 1 is a structural diagram of a three-dimensional map generation system 500 and a three-dimensional map generation device 100 according to the present embodiment.

The three-dimensional map generation system 500 according to the present embodiment generates three-dimensional map information 11 representing a three-dimensional map for use in automated driving by using first measured data 20 acquired from a measurement vehicle 200 moving in a measurement area 50.

The three-dimensional map generation system 500 includes a three-dimensional map generation device 100 and the measurement vehicle 200.

The three-dimensional map generation device 100 generates the three-dimensional map information 11 representing a three-dimensional map for use in automated driving and so forth. The three-dimensional map information 11 is also referred to as a high-precision three-dimensional map or dynamic map.

The measurement vehicle 200 is an MMS measurement vehicle which measures the first measured data 20 by MMS. The first measured data 20 is MMS measured data. MMS is a device which has equipment such as GPS (Global Positioning System) and a laser scanner camera mounted on the vehicle and efficiently and precisely acquires three-dimensional position information about the periphery of a road, such as the shapes of buildings and roads, signs, guard rails, characters on road surfaces, and manholes, while traveling. MMS uses GNSS (Global Navigation Satellite System) positioning for measuring a current position on the ground by using an artificial satellite and taking the entire earth as a positioning target.

The three-dimensional map generation system 500 is a system included in a dynamic map center. The dynamic map center generates a high-precision three-dimensional map, which is a platform map for use in automated driving and so forth, that is, a dynamic map. The high-precision three-dimensional map generated herein is mainly static information. The dynamic map center acquires MMS measured data from the MMS measurement vehicle to generate, update, and manage a high-precision three-dimensional map. When the high-precision three-dimensional map is completed, the dynamic map center distributes the high-precision three-dimensional map to an organization such as a map supplier.

When the MMS measured data has a shortage of data, a defective area occurs, where MMS measured data is not present, in the high-precision three-dimensional map. The following is an example of a shortage of data occurring in the MMS measured data.

When a vehicle traveling alongside the MMS measurement vehicle or a parked or stopped vehicle is present, reflection data from the road surface cannot be obtained, and thus the MMS measured data falls short. Also, reflection data from the road surface may not be obtainable when the road surface at the time of MMS measurement is in a wet state due to the weather event such as rain or snow, and the MMS measured data falls short. Furthermore, the MMS measured data falls short when an unmeasured section is present at a joint between MMS measured data and MMS measured data.

The three-dimensional map generation device 100 is a computer. The three-dimensional map generation device 100 includes a processor 910, as well as other hardware such as a memory 921, an auxiliary storage device 922, and a communication device 930. The processor 910 is connected to other pieces of hardware via signal lines to control these pieces of hardware.

The three-dimensional map generation device 100 includes, as functional components, a measured data accepting unit 110, a determination unit 120, and a generation unit 130. In the memory 921, a high-precision three-dimensional map information 11 is stored.

The functions of the measured data accepting unit 110, the determination unit 120, and the generation unit 130 are implemented by software.

The processor 910 is a device which executes a three-dimensional map generation program. The three-dimensional map generation program is a program for implementing the functions of the measured data accepting unit 110, the determination unit 120, and the generation unit 130.

The processor 910 is an IC (Integrated Circuit) which performs arithmetic operation process. Specific examples of the processor 910 include a CPU, DSP (Digital Signal Processor), and GPU (Graphics Processing Unit).

The memory 921 is a storage device which temporarily stores data. Specific examples of the memory 921 include an SRAM (Static Random Access Memory) or DRAM (Dynamic Random Access Memory). In the memory 921, information such as the three-dimensional map information 11 and a threshold 12 is stored.

The auxiliary storage device 922 is a storage device which stores data. A specific example of the auxiliary storage device 922 is an HDD. Also, the auxiliary storage device 922 may be a portable storage medium such as an SD (registered trademark) memory card, CF, NAND flash, flexible disc, optical disc, compact disc, Blu-ray (registered trademark) disc, or DVD. Note that HDD is an abbreviation of Hard Disk Drive. SD (registered trademark) is an abbreviation of Secure Digital. CF is an abbreviation of CompactFlash (registered trademark). DVD is an abbreviation of Digital Versatile Disk.

The communication device 930 communicates another device via a network. The communication device 930 has a receiver and a transmitter. The communication device 930 is connected by wire or wirelessly to a communication network such as a LAN, the Internet, or a telephone line. The communication device 930 is, specifically, a communication chip or an NIC (Network Interface Card). The three-dimensional map generation device 100 receives the first measured data 20 from the measurement vehicle 200 via the communication device 930.

The three-dimensional map generation program is read into the processor 910, and is executed by the processor 910. In the memory 921, not only the three-dimensional map generation program but also an OS (Operating System) is stored. The processor 910 executes the three-dimensional map generation program while executing the OS. The three-dimensional map generation program and the OS may be stored in the auxiliary storage device 922. The three-dimensional map generation program and the OS stored in the auxiliary storage device 922 are loaded into the memory 921 and executed by the processor 910. Note that an entire or part of the three-dimensional map generation program may be incorporated into the OS.

Data, information, signal values, and variable values to be used, processed, or outputted by the three-dimensional map generation program are stored in the memory 921, the auxiliary storage device 922, or a register or cache memory in the processor 910.

The "unit" of each of the measured data accepting unit 110, the determination unit 120, and the generation unit 130 may be read as a "process", "procedure", or "step". The three-dimensional map generation program causes a computer to perform each process, each procedure, or each step, with the "unit" of each of the measured data accepting unit 110, the determination unit 120, and the generation unit 130 being read as a "process", "procedure", or "step". Also, a three-dimensional map generation method is a method to be performed by the three-dimensional map generation device 100 executing the three-dimensional map generation program.

The three-dimensional map generation program may be provided as being stored in a computer-readably recording medium. Also, the three-dimensional map generation program may be provided as a program product.

Description of Operation

Figure 2:
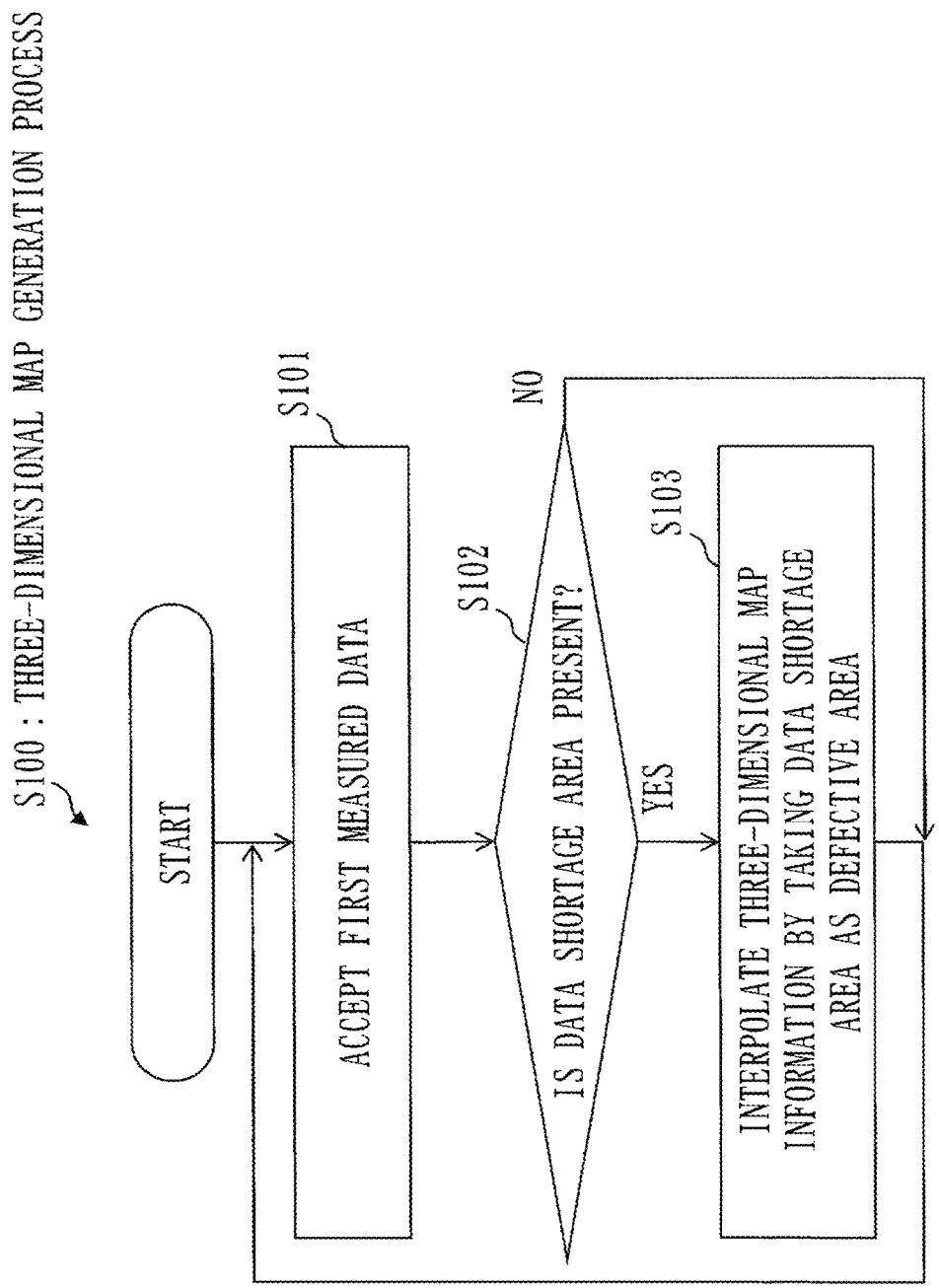
FIG. 2 is a flow diagram of a three-dimensional map generation process according to Embodiment 1.

FIG. 2 is a flow diagram of a three-dimensional map generation process S100 according to the present embodiment.

Figure 3:
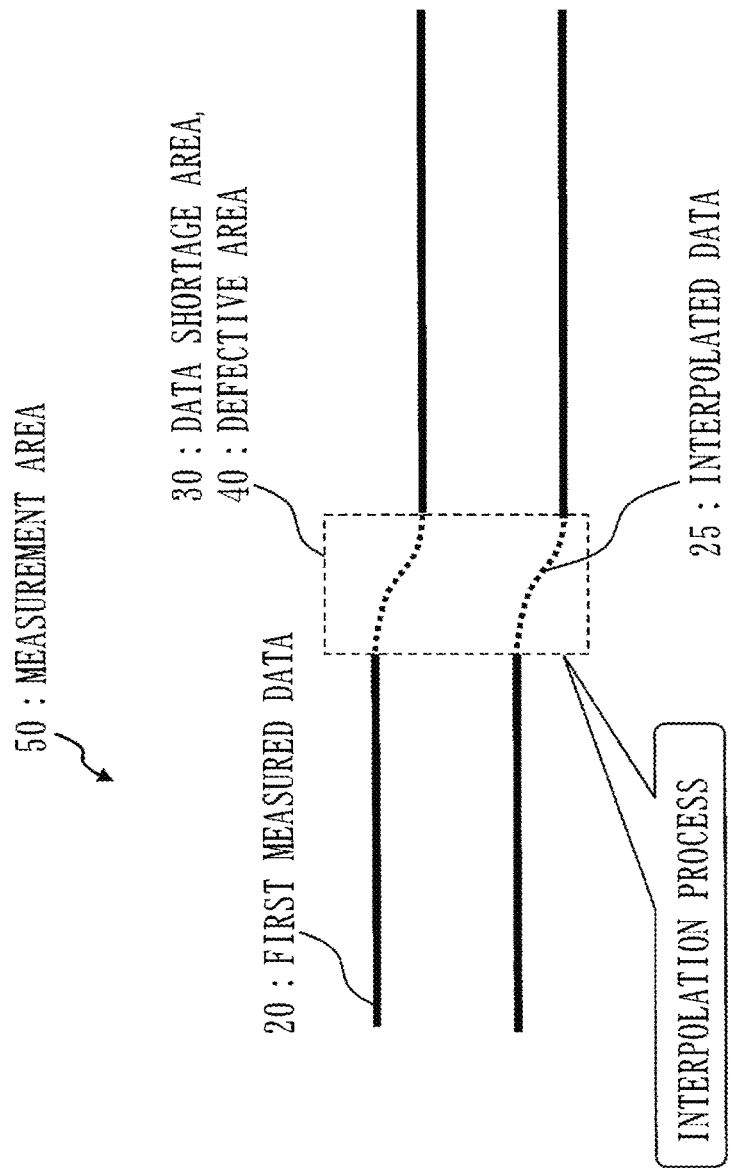
FIG. 3 is a schematic diagram illustrating the three-dimensional map generation process according to Embodiment 1.

FIG. 3 is a schematic diagram illustrating the three-dimensional map generation process S100 according to the present embodiment.

In the three-dimensional map generation process S100, the generation unit 130 generates, on a real-time basis, the three-dimensional map information 11 representing a three-dimensional map, which is static information, such as road surface information, lane information, and three-dimensional structures, by using the first measured data 20. In the present embodiment, when it is determined by the determination unit 120 that a data shortage area 30 is present, the generation unit 130 generates the three-dimensional map information 11 as interpolating static information of the data shortage area 30.

First, at step S101, the measured data accepting unit 110 accepts, via the communication device 930, measured data acquired by the measurement vehicle 200 as the first measured data 20.

<Determination Process>

At step S102, the determination unit 120 determines the data shortage area 30 where measured data for generating a three-dimensional map falls short from the measurement area 50, based on the first measured data 20 transmitted from the measurement vehicle 200. Specifically, the determination unit 120 detects, in the first measured data 20, an area where a white line is cut in mid-course or the position information of the first measured data 20 extremely fluctuates to extract the data shortage area 30 where the measured data falls short. The first measured data 20 is also referred to as point cloud data.

If it is determined that the data shortage area 30 is present, the process proceeds to step S103. If it is determined that the data shortage area 30 is absent, the normal three-dimensional map generation process continues.

The determination process by the determination unit 120 is also referred to as a shortage-of-data extraction process.

<Interpolation Process>

At step S103, by taking the data shortage area 30 as a defective area 40, the generation unit 130 generates interpolated data 25 which interpolates three-dimensional map information of the defective area 40. The defective area 40 is an area where the three-dimensional map information is to be interpolated. Specifically, the generation unit 130 performs interpolation by a mathematical model using an easement curve. A specific example of an interpolation method using a mathematical model is circular interpolation.

As illustrated in FIG. 3, the generation unit 130 generates interpolated data 25 which interpolates the three-dimensional map information such as a division line of a road in the defective area 40 by an easement curve. Here, the generation unit 130 interpolates the defective area 40 so that outward acceleration applied to the traveling vehicle traveling a road in the defective area 40 at a traveling speed V does not cause discomfort to a person. As a specific example, by using circular interpolation, the generation unit 130 generates the interpolated data 25 so that outward acceleration applied to the traveling vehicle traveling at the traveling speed V does not cause discomfort to a person.

The generation unit 130 generates the interpolated data 25 so that a lateral G, which is centrifugal force in a lateral direction applied to the traveling vehicle traveling the road in the defective area 40 at the traveling speed V, is equal to or less than a predefined threshold 12. Here, the traveling speed V is set at a road limit speed or an average speed of the vehicle traveling the road.

Generally, the lateral G which gives discomfort to a person is on the order of 0.5 G. Thus, the threshold 12 is preferably set at a value on the order of 0.5 G.

That is, by an easement curve which satisfies the lateral $G=(V^2/R/g) \leq 0.5$ G, where the traveling speed is V, a radius of curvature of an arc part of the road is R, and acceleration of gravity is g, the interpolated data 25 which interpolates the three-dimensional map information in the defective area 40 is generated.

As described above, the generation unit 130 generates the interpolated data 25 so that the lateral G applied to the traveling vehicle traveling the road in the defective area 40 at the traveling speed V is equal to or less than 0.5 G. Note that the generation unit 130 more preferably performs interpolation so that the lateral G applied to the traveling vehicle traveling the road in the defective area 40 at the traveling speed V is equal to or more than 0.2 G and equal to or less than 0.3 G.

Note that the data shortage area 30 according to the present embodiment is assumed to be a shortage-of-data section on the order of approximately 10 meters. This is because interpolation can be appropriately made without additional measurement if the shortage of data is up to on the order of approximately 10 meters.

Other Structures

The three-dimensional map generation device 100 may include an input interface and an output interface. The input interface is a port to be connected to an input device such as a mouse, keyboard, or touch panel. The input interface is, specifically, a USB (Universal Serial Bus) terminal. Note that the input interface may be a port to be connected to a LAN (Local Area Network).

The output interface is a port to which a cable of an output device such as a display is to be connected. The output interface is, specifically, a USB terminal or HDMI (registered trademark) (High Definition Multimedia Interface) terminal. The display is, specifically, an LCD (Liquid Crystal Display).

In the present embodiment, the determination unit 120 is automatically determines the data shortage area 30, that is, the defective area 40. However, the three-dimensional map generation device 100 may acquire the defective area 40 specified by an operator by using the input interface and the output interface. Specifically, to the first measured data 20 displayed on a monitor such as a touch panel, the operator selects the defective area 40 by using a pen or the like. Then, the generation unit 130 may acquire, via the input interface, the defective area 40 selected by the operator to generate the interpolated data 25 for the defective area 40.

Also, while the functions of the "units" in the three-dimensional map generation device 100 are implemented by software in the present embodiment, as a modification example, the functions of the "units" in the three-dimensional map generation device 100 may be implemented by hardware.

Specifically, the three-dimensional map generation device 100 may include an electronic circuit in place of the processor.

The electronic circuit is a dedicated electronic circuit which implements the functions of the "units" in the three-dimensional map generation device 100.

The electronic circuit is, specifically, a single circuit, composite circuit, programmed processor, parallel-programmed processor, logic IC, GA, ASIC, or FPGA. GA is an abbreviation of Gate Array. ASIC is an abbreviation of Application Specific Integrated Circuit. FPGA is an abbreviation of Field-Programmable Gate Array.

The functions of the "units" in the three-dimensional map generation device 100 may be implemented by one electronic circuit or may be implemented as being distributed into a plurality of electronic circuits.

As another modification example, part of the functions of the "units" in the three-dimensional map generation device 100 may be implemented by the electronic circuit and the remaining functions may be implemented by software.

Each of the processor and the electronic circuit is also referred to as processing circuitry. That is, the functions of the "units" in the three-dimensional map generation device 100 are implemented by processing circuitry.

Description of Effects of Present Embodiment

As described above, in the three-dimensional map generation system according to the present embodiment, the generation unit which generates a high-precision three-dimensional map has a function of interpolating a defective area due to a shortage of measured data. Thus, according to the three-dimensional map generation system of the present embodiment, even if the measured data falls short, interpolation can be appropriately made by taking a data shortage area where measured data falls short as a defective area.

Also, in the three-dimensional map generation system according to the present embodiment, the generation unit sets the vehicle speed at a predetermined value, and interpolates the defective area by using an easement curve so as not to cause discomfort to a person with that speed. Thus, according to the three-dimensional map generation system of the present embodiment, the three-dimensional map information such as a division line of a road can be more appropriately interpolated.

Embodiment 2

In the present embodiment, differences from Embodiment 1 are mainly described.

Note that since the structure of the three-dimensional map generation device 100 is similar to that of Embodiment 1, illustration is omitted. Also, structures similar to the structures described in Embodiment 1 are provided with the same reference characters and their description is omitted.

In Embodiment 1, as an interpolation method for the generation unit 130 to interpolate the defective area 40, circular interpolation is used. In the present embodiment, a case is described in which the generation unit 130 uses NURBS interpolation, which is an interpolation method taking a NURBS curve as a mathematical model.

Figure 4:
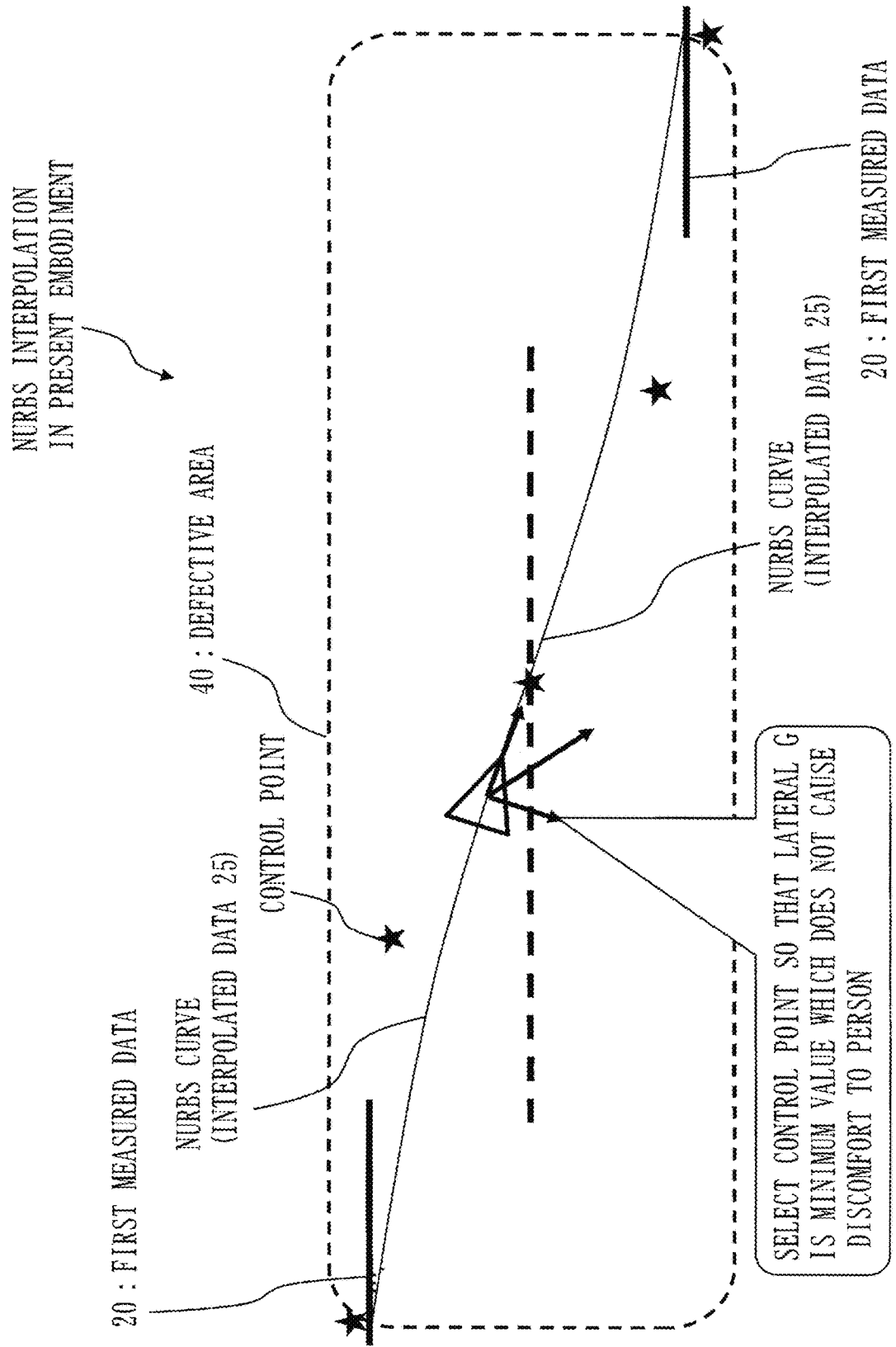
FIG. 4 is a schematic diagram illustrating NURBS interpolation in a defective area according to Embodiment 2.

FIG. 4 is a schematic diagram illustrating NURBS interpolation in the defective area 40 according to the present embodiment.

In FIG. 4, the defective area 40 where the first measured data 20 falls short is interpolated by a NURBS curve. In particular, in FIG. 4, a state is illustrated in which a control point is selected so that the lateral G, which is outward acceleration, is a minimum value which does not cause discomfort to a person to generate a NURBS curve as the interpolated data 25.

Thus, in the present embodiment, the generation unit 130 generates the interpolated data 25 which interpolates three-dimensional map information such as a division line of a road in the defective area 40 by a NURBS (Non-Uniform Rational B-Spline) curve so that the lateral G applied to the traveling vehicle traveling the road in the defective area 40 at the traveling speed V is equal to or less than the threshold 12, which is the minimum value which does not cause discomfort to a person.

As described above, the minimum value of the lateral G which does not cause discomfort to a person is on the order of 0.5 G. Thus, by a NURBS curve which satisfies the lateral $G=(V^2/R/g) \leq 0.5$ G, where the traveling speed is V, a radius of curvature of an arc part of the road is R, and acceleration of gravity is g, the generation unit 130 generates the interpolated data 25 which interpolates the three-dimensional map information in the defective area 40. Note that the defective area 40 is more preferably interpolated by a NURBS curve which satisfies 0.2 G the lateral $G=(V^2/R/g) \leq 0.3$ G.

As described above, in the three-dimensional map generation system according to the present embodiment, a control point is selected so that the lateral G applied to the traveling vehicle traveling the road in the defective area at the traveling speed V is a minimum value which does not cause discomfort to a person to perform NURBS interpolation. Thus, according to the three-dimensional map generation system of the present embodiment, a connecting work of more appropriately connecting the defective area can be automated. That is, according to the three-dimensional map generation system of the present embodiment, fused connection can be more appropriately made by taking a different division line as an end point.

Embodiment 3

In the present embodiment, differences from Embodiments 1 and 2 are mainly described. Structures similar to the structures described in Embodiments 1 and 2 are provided with the same reference characters and their description is omitted.

Description of Structure

Figure 5:
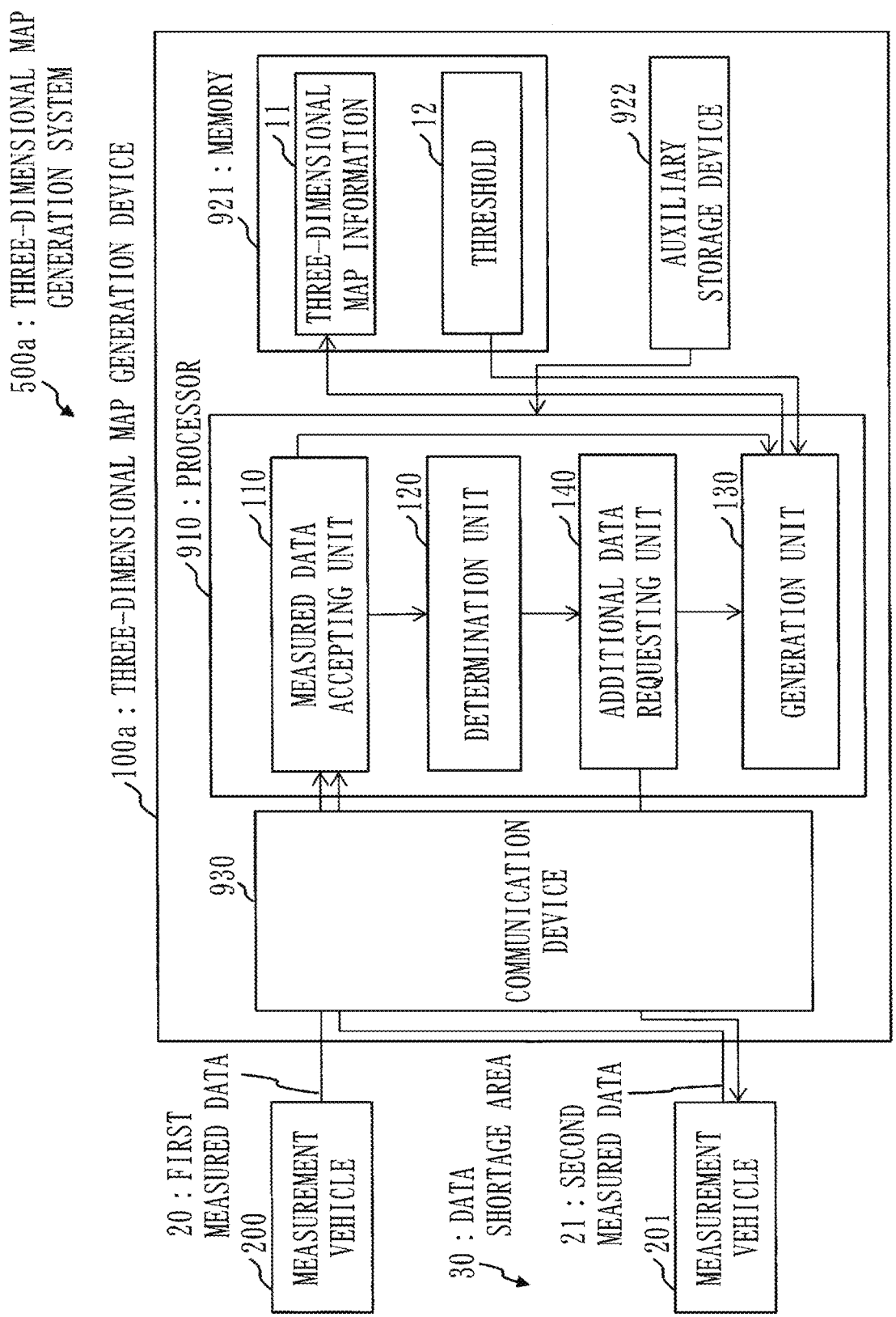
FIG. 5 is a structural diagram of a three-dimensional map generation system and a three-dimensional map generation device according to Embodiment 3.

FIG. 5 is a structural diagram of a three-dimensional map generation system 500a and a three-dimensional map generation device 100a according to the present embodiment.

In Embodiment 1, the mode is described in which the three-dimensional map generation system 500a interpolates the data shortage area 30 on the order of approximately 10 meters without additional measurement. In the present embodiment, a mode is described in which the determination unit 120 extracts the data shortage area 30 equal to or more than 10 meters, for example, on the order of 20 meters to 50 meters. When the data shortage area 30 on the order of 20 meters to 50 meters is extracted, the three-dimensional map generation system 500a performs additional measurement for the data shortage area 30, and smoothly connects original measured data and additional measured data to generate the three-dimensional map information 11.

The three-dimensional map generation system 500*a* according to the present embodiment includes a three-dimensional map generation device 100*a*, the measurement vehicle 200, and a measurement vehicle 201 traveling in the neighborhood of the data shortage area 30.

Also, in addition to the components described in Embodiment 1, the three-dimensional map generation device 100*a* includes an additional data requesting unit 140.

The additional data requesting unit 140 makes a request for measured data which falls short for the data shortage area 30 as second measured data 21. The additional data requesting unit 140 requests, via the communication device 930, the second measured data 21, which is additional measured data for the data shortage area 30, from the measurement vehicle 201 traveling in the neighborhood of the data shortage area 30.

The measured data accepting unit 110 acquires, via the communication device 930, the second measured data 21 from the measurement vehicle 201.

The generation unit 130 takes an area including a joint between the first measured data 20 and the second measured data 21 as the defective area 40. The generation unit 130 generates the interpolated data 25 which interpolates three-dimensional map information of the defective area 40 so as to connect the first measured data 20 and the second measured data 21.

Description of Operation

Figure 6:
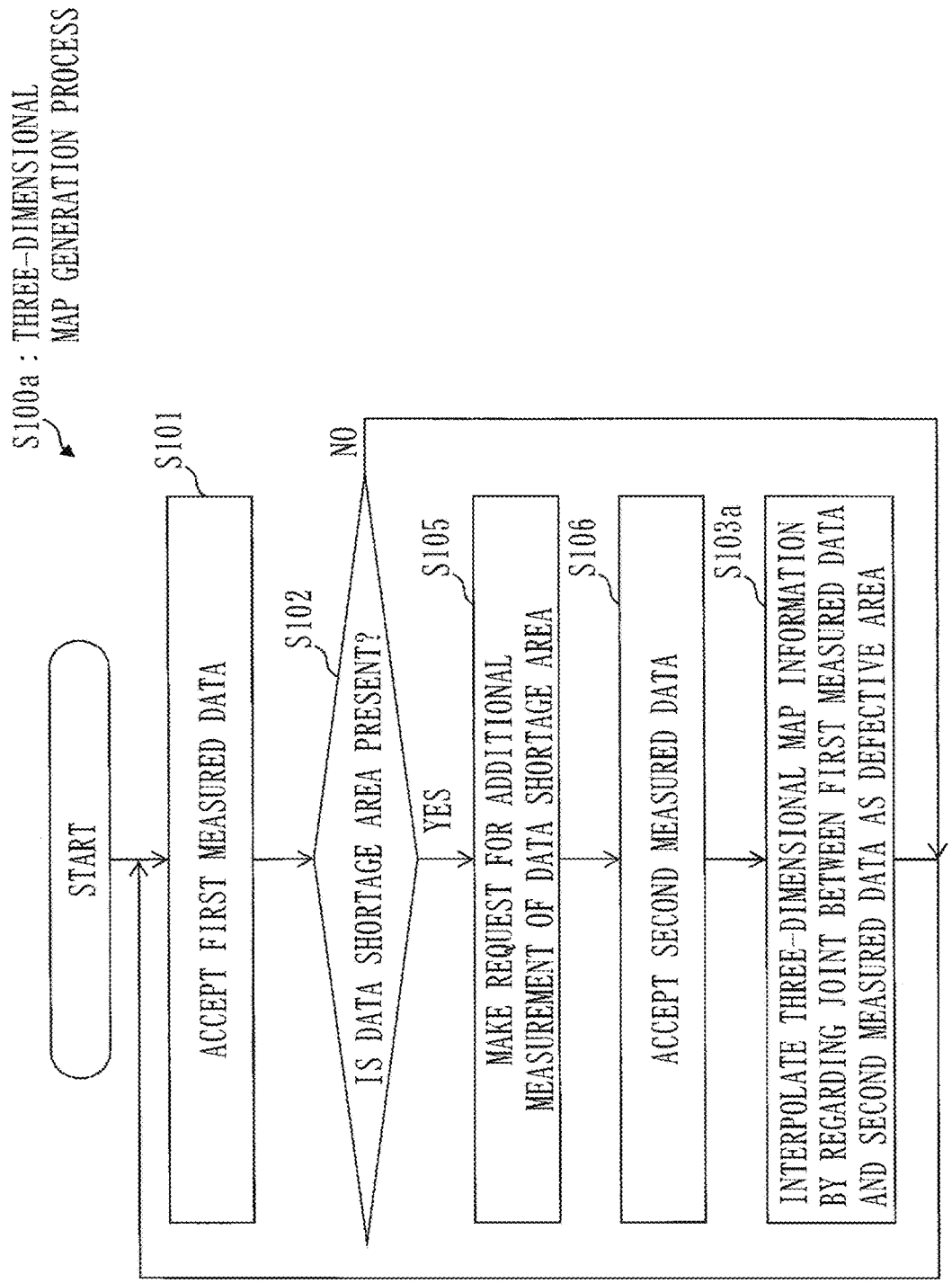
FIG. 6 is a flow diagram of a three-dimensional map generation process according to Embodiment 3.

FIG. 6 is a flow diagram of a three-dimensional map generation process S100*a* according to the present embodiment.

Figure 7:
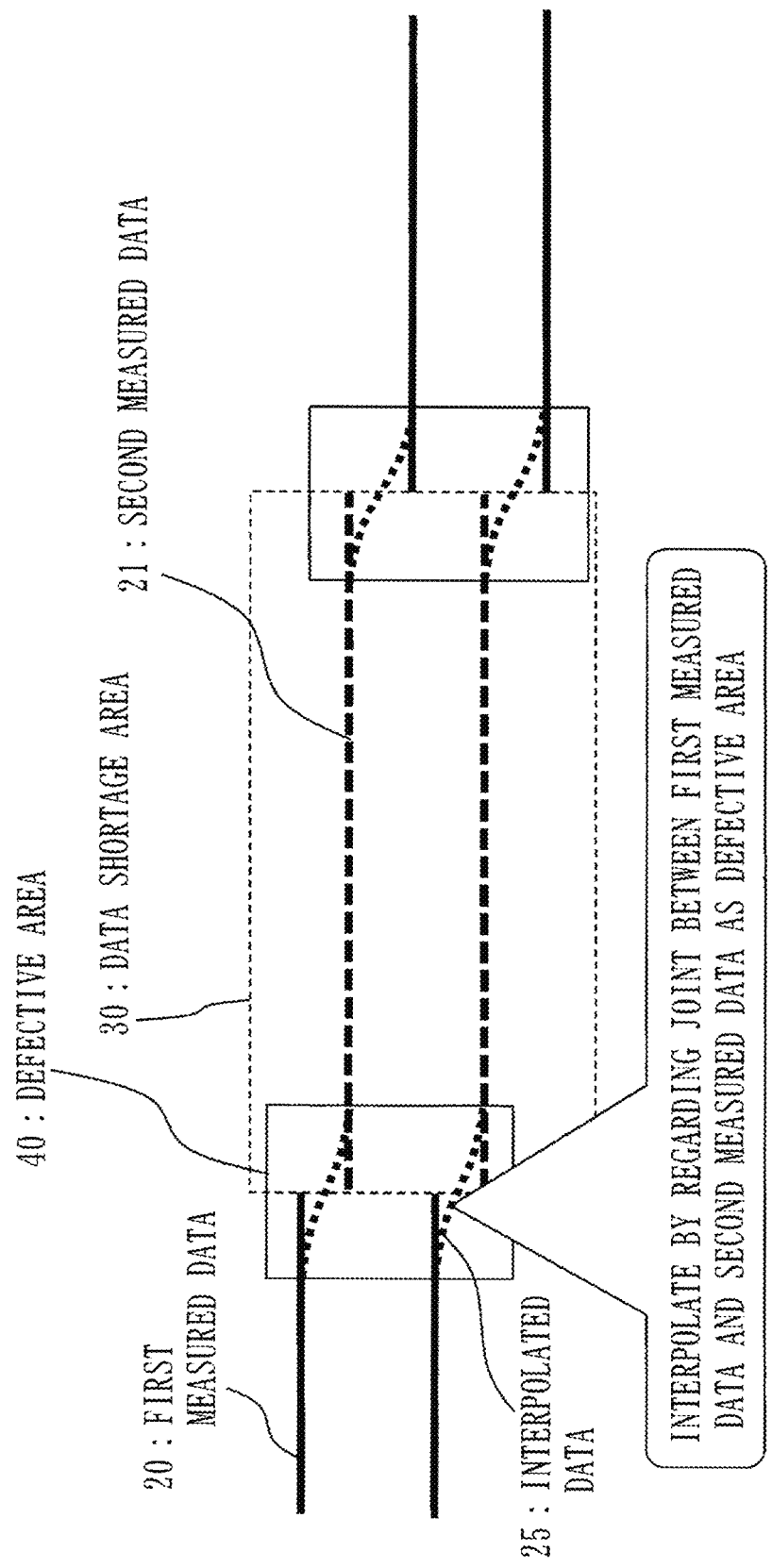
FIG. 7 is a schematic diagram illustrating the three-dimensional map generation process according to Embodiment 3.

FIG. 7 is a schematic diagram illustrating the three-dimensional map generation process S100*a* according to the present embodiment.

The processes at step S101 and step S102 are similar to those in Embodiment 1.

If it is determined that the data shortage area 30 is present, the process proceeds to step S105. If it is determined that the data shortage area 30 is absent, the normal three-dimensional map generation process continues.

At step S105, the additional data requesting unit 140 makes a request for measured data which falls short for the data shortage area 30 as the second measured data 21.

Specifically, an area number of the data shortage area 30 is identified by the determination unit 120. The additional data requesting unit 140 notifies the measurement vehicle 201 traveling near the data shortage area 30 identified by the area number of the area number, and makes a request for measurement of measured data for the data shortage area 30. Alternatively, a request for additional measurement may be given to a measurement provider. The measurement vehicle 201 performs additional measurement for the data shortage area 30. The measurement vehicle 201 transmits the second measured data 21 acquired by additional measurement to the three-dimensional map generation device 100*a*.

At step S106, the measured data accepting unit 110 acquires the second measured data 21 via the communication device 930. The measured data accepting unit 110 outputs the second measured data 21 to the generation unit 130.

At step S103*a*, the generation unit 130 takes an area including a joint between the first measured data 20 and the second measured data 21 as the defective area 40. The generation unit 130 generates the interpolated data 25 which interpolates the defective area 40 so as to connect the first measured data 20 and the second measured data 21 in the defective area 40. The generation unit 130 generates the interpolated data 25 so as to smoothly connect the first measured data 20 and the second measured data 21 in the defective area 40.

In FIG. 7, an area including a joint between the first measured data 20 and the second measured data 21, which is additional measured data for the data shortage area 30, is taken as the defective area 40. The generation unit 130 generates the interpolated data 25 which smoothly joints the first measured data 20 and the second measured data 21 in the defective area 40.

Note that the interpolation method of smoothly connecting the first measured data 20 and the second measured data 21 is similar to those described in Embodiments 1 and 2.

Other Structures

In the present embodiment, the three-dimensional map generation device 100*a* includes the measured data accepting unit 110, the determination unit 120, the generation unit 130, and the additional data requesting unit 140. However, as a modification example of the present embodiment, it may be configured that the measurement vehicle 200 includes the determination unit 120 and the additional data requesting unit 140 and the three-dimensional map generation device 100*a* includes the measured data accepting unit 110 and the generation unit 130.

In this case, the measurement vehicle 200 can make a request for additional measurement as performing a shortage-of-data extraction process by the determination unit 120. Thus, when a shortage of data is extracted, the measurement vehicle 200 can perform additional measurement on a real-time basis.

Description of Effects of Present Embodiment

According to the three-dimensional map generation system of the present embodiment, additional measurement of the data shortage area is performed, and new measurement point group data acquired by the additional measurement can be combined to old measurement point group data. When a series of first measured data and a series of second measured data are data-jointed, they may become discontinuous. Even if they become discontinuous, according to the three-dimensional map generation system of the present embodiment, a portion near the connection location between the first measured data and the second measured data is regarded as the defective area described in Embodiment 1, and the interpolation process similar to that of Embodiment 1 can be performed. Thus, according to the three-dimensional map generation system of the present embodiment, even if additional measurement is performed, higher-precision three-dimensional map information can be acquired.

Embodiment 4

In the present embodiment, differences from Embodiment 3 are mainly described.

Note that since the structure of the three-dimensional map generation device 100*a* is similar to that of Embodiment 3, illustration is omitted. Also, structures similar to the structures described in Embodiments 1 to 3 are provided with the same reference characters and their description is omitted.

In Embodiment 3, the interpolation process is performed by regarding the joint between the first measured data 20 and the second measured data 21 acquired by additional measurement of the data shortage area 30 as the defective area 40. In the present embodiment, a mode is described in which this technique in Embodiment 3 is applied to a work for updating a three-dimensional map.

Figure 8:
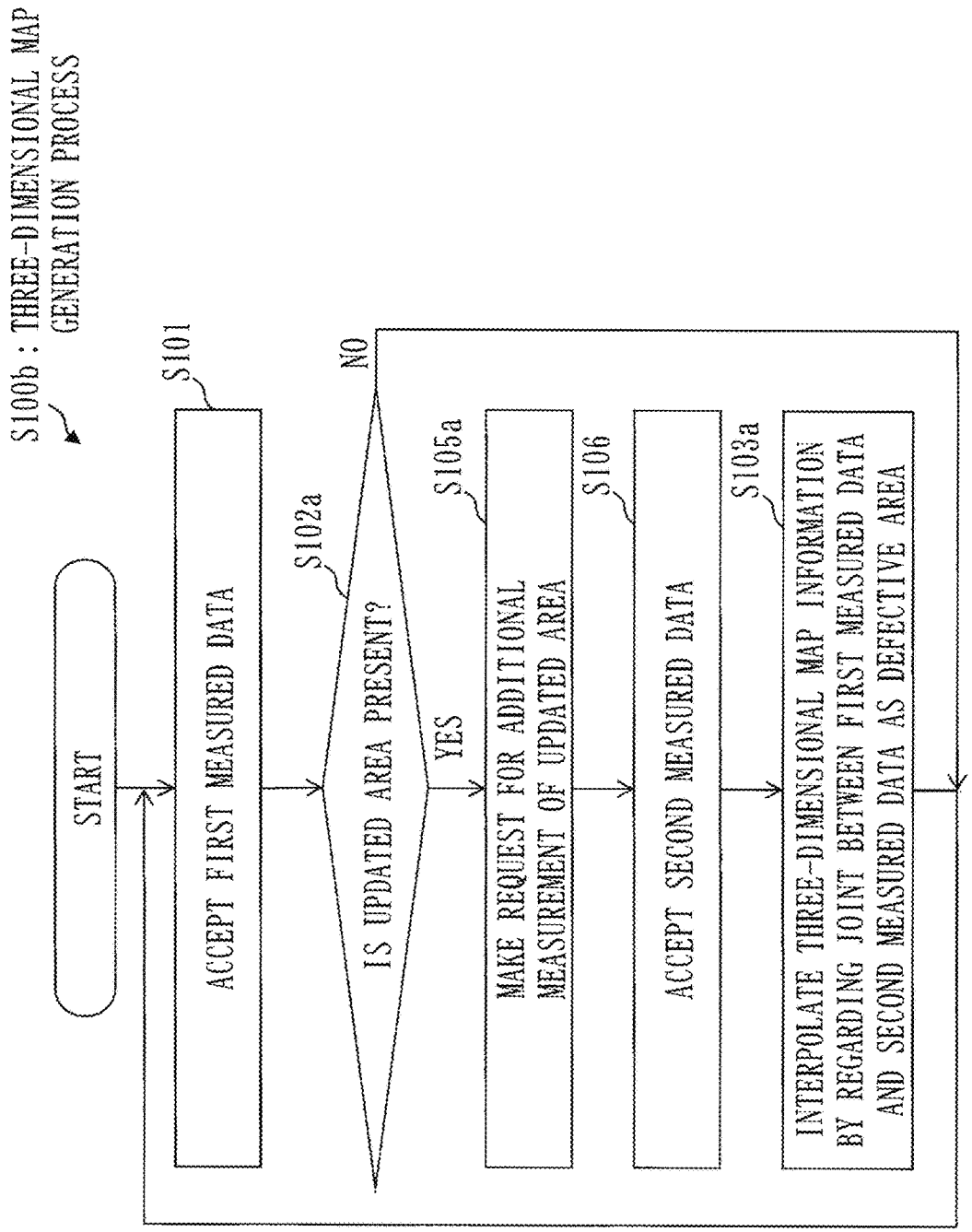
FIG. 8 is a flow diagram of a three-dimensional map generation process according to Embodiment 4.

FIG. 8 is a flow diagram of a three-dimensional map generation process S100b according to the present embodiment.

Figure 9:
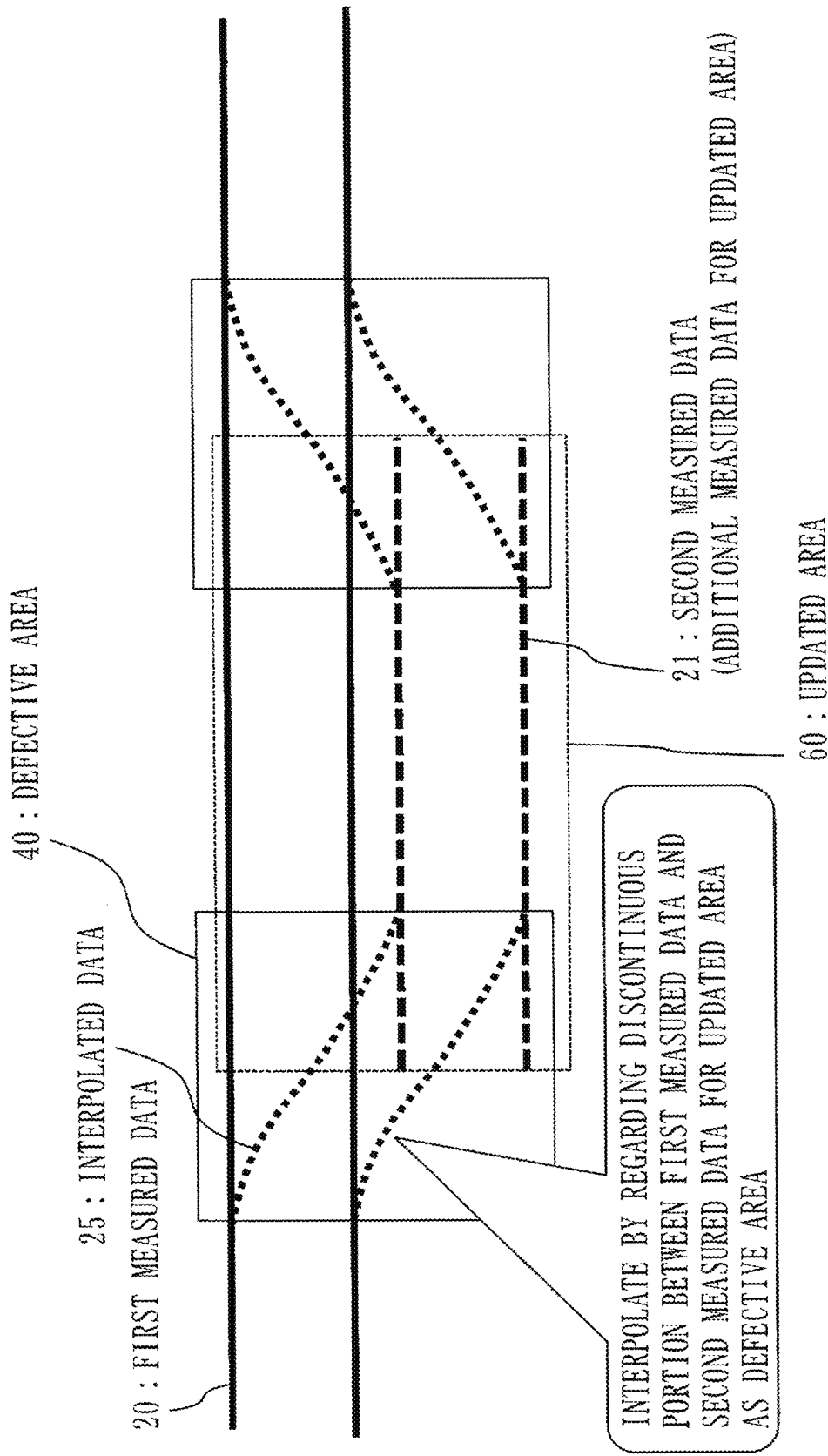
FIG. 9 is a schematic diagram illustrating the three-dimensional map generation process according to Embodiment 4.

FIG. 9 is a schematic diagram illustrating the three-dimensional map generation process S100b according to the present embodiment.

The process at step S101 is similar to that of Embodiment 1.

At step S102a, the determination unit 120 acquires an updated area 60 where the three-dimensional map has been updated in the measurement area 50. Specifically, upon notification from an organization which manages the road, such as a road management company, the determination unit 120 detects a road updated location as the updated area 60.

At step S105a, the additional data requesting unit 140 makes a request for measured data which falls short for the updated area 60 as the second measured data 21. The additional data requesting unit 140 requests the second measured data 21 from the measurement vehicle 201 which is able to acquire second measured data. Specifically, the additional data requesting unit 140 requests additional measurement from the measurement vehicle 201 traveling near the updated area 60. Alternatively, the additional data requesting unit 140 may request additional measurement of the updated area 60 from the measurement provider.

The process at step S106 is similar to that of Embodiment 3. That is, the measured data accepting unit 110 acquires the second measured data 21, which is additional measured data for the updated area 60, via the communication device 930. The measured data accepting unit 110 outputs the second measured data 21 to the generation unit 130.

The process at step S103a is similar to that of Embodiment 3. That is, the generation unit 130 takes an area including a joint between the first measured data 20 and the second measured data 21, which is additional measured data for the updated area 60, as the defective area 40. The generation unit 130 generates the interpolated data 25 which interpolates the defective area 40 so as to connect the first measured data 20 and the second measured data 21.

In FIG. 9, an area including a joint between the first measured data 20 and the second measured data 21, which is additional measured data for the updated area 60, is taken as the defective area 40. The generation unit 130 generates the interpolated data 25 which smoothly joints the first measured data 20 and the second measured data 21 in the defective area 40.

Note that the interpolation method of smoothly connecting the first measured data 20 and the second measured data 21 is similar to those described in Embodiments 1 and 2.

Description of Effects of Present Embodiment

In this manner, according to the three-dimensional map generation system of the present embodiment, by regarding the data shortage area in Embodiment 3 as an updated area, with a process similar to that of Embodiment 3, a work for updating the three-dimensional map can be performed. Thus, according to the three-dimensional map generation system of the present embodiment, map updating can be automated.

Embodiment 5

In the present embodiment, differences from Embodiments 1 to 4 are mainly described.

Note that since the structure of the three-dimensional map generation device 100 is similar to that of Embodiments 1 to 4, illustration is omitted. Also, structures similar to the structures described in Embodiments 1 to 4 are provided with the same reference characters and their description is omitted.

Figure 10:
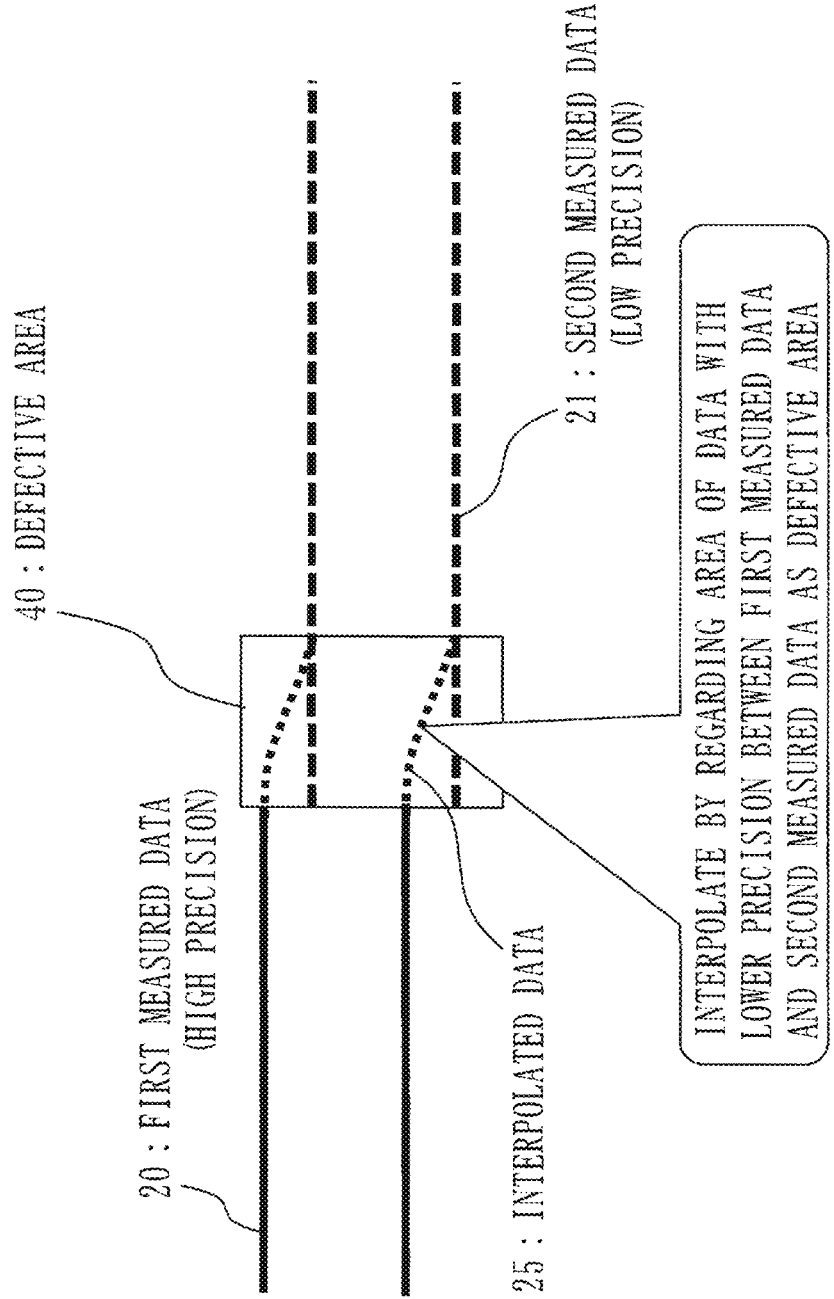
FIG. 10 is a schematic diagram illustrating an example of an interpolation process according to Embodiment 5.

FIG. 10 is a schematic diagram illustrating an example of an interpolation process according to the present embodiment.

In the present embodiment, in Embodiments 3 and 4, when a difference in quality between measurement precisions of the first measured data 20 and the second measured data 21 has been known, a portion near a connection of measured data with low measurement precision is regarded as the defective area 40, and the interpolation process described in Embodiments 1 and 2 is described. The quality of measurement precision is represented by the degree of precision.

As illustrated in FIG. 10, the generation unit 130 compares the precision of the first measured data 20 and the precision of the second measured data 21, and generates the interpolated data 25 by taking the area of the measured data with a lower degree of precision as the defective area 40.

Here, the degree of precision is determined based on information, for example, Dop (Dilution Of Precision) arrangement representing the influence of measurement precision by the arrangement of a GPS satellite, precision of point cluster data, and FIX rate, which is a ratio of calculating a high-precision solution by GNSS positioning.

In FIG. 10, the interpolation process is performed by regarding a portion of the measured data with a lower degree of precision between the precision of the first measured data 20 and the precision of the second measured data 21 as the defective area 40. That is, the second measured data 21 with a lower degree of precision is replaced by the interpolated data 25.

FIG. 11 is a schematic diagram illustrating another example of the interpolation process according to the present embodiment.

As illustrated in FIG. 11, the generation unit 130 may select the defective area 40 based on a ratio between the precision of the first measured data 20 and the precision of the second measured data 21.

It is assumed that a ratio between the length of the first measured data 20 and the length of the second measured data 21 in the defective area 40 is $\alpha 1:\beta 1$. When the precision of the first measured data 20 is higher than the precision of the second measured data 21, the defective area 40 is selected so that $\alpha 1 < \beta 1$ holds. For example, when the precision of the first measured data 20 is 90% and the precision of the second measured data 21 is 60%, the ratio between the precision of the first measured data 20 and the precision of the second measured data 21 is 3:2. Here, the defective area 40 may be selected so that $\alpha 1:\beta 1=2:3$ holds.

In this manner, according to the three-dimensional map generation system of the present embodiment, the measurement point group data with a lower degree of precision can be matched to the measurement point group data with a higher degree of precision, and higher-precision three-dimensional map information can be generated.

Embodiment 6

In the present embodiment, differences from Embodiments 1 to 5 are mainly described.

Note that since the structure of the three-dimensional map generation device 100 is similar to that of Embodiments 1 to 5, illustration is omitted. Also, structures similar to the structures described in Embodiments 1 to 5 are provided with the same reference characters and their description is omitted.

FIG. 12 is a schematic diagram illustrating an example of an interpolation process according to the present embodiment.

In the present embodiment, the interpolation process is described which is performed by regarding the joint between the first measured data 20 and the second measured data 21, which is the additional measured data for the updated area 60, as the defective area 40.

In FIG. 12, the generation unit 130 sets intermediate measured data 23 positioned at an intermediate point between the first measured data 20 and the second measured data 21 in the updated area 60, based on the precision of the first measured data 20 and the precision of the second measured data 21. Then, the generation unit 130 generates the interpolated data 25 which connects the first measured data 20 and the intermediate measured data 23 in the defective area 40 including the joint between the first measured data 20 and the intermediate measured data 23.

Here, the degree of precision is determined, as with Embodiment 5, based on information such as Dop arrangement, precision of point cluster data, and FIX rate.

In FIG. 12, the generation unit 130 sets the intermediate measured data 23 in the updated area 60 based on the ratio between the precision of the first measured data 20 and the precision of the second measured data 21.

It is assumed that a ratio between the length from the first measured data 20 to the intermediate measured data 23 and the length from the second measured data 21 to the intermediate measured data 23 in the updated area 60 is α2:β2. When the precision of the first measured data 20 is lower than the precision of the second measured data 21, the intermediate measured data 23 is set so that α2>β2 holds. For example, when the precision of the first measured data 20 is 45% and the precision of the second measured data 21 is 90%, the ratio between the precision of the first measured data 20 and the precision of the second measured data 21 is 1:2. Here, the intermediate measured data 23 may be set so that α2:β2=2:1 holds.

As described above, according to the three-dimensional map generation system of the present embodiment, the measured data of the updated area can be set by using weights based on the precision of the measured data. Thus, higher-precision three-dimensional map information can be generated.

In the above-described embodiments, each "unit" as an independent functional block configures the three-dimensional map generation system. However, the structure of the three-dimensional map generation system may not be as described above, and may be any. Any functional block of the three-dimensional map generation system capable of implementing the functions described in the above-described embodiment can be adopted. Any other combination or any block structure of these functional blocks may be adopted to configure the three-dimensional map generation system.

While Embodiments 1 to 6 have been described, a plurality of portions of these embodiments may be implemented in combination. Alternatively, one portion of these embodiments may be implemented. In addition, these embodiments may be wholly or partially implemented in any combination.

Note that the above-described embodiment is a basically preferable example, is not intended to restrict the present invention, applications thereof, or its range of use, and can be variously modified as required.

REFERENCE SIGNS LIST

11: three-dimensional map information; 12: threshold; 20: first measured data; 21: second measured data; 23: intermediate measured data; 25: interpolated data; 30: data shortage area; 40: defective area; 50: measurement area; 60: updated area; 100, 100a: three-dimensional map generation device; 110: measured data accepting unit; 120: determination unit; 130: generation unit; 140: additional data requesting unit; 200, 201: measurement vehicle; 500, 500a, 500b: three-dimensional map generation system; 910: processor; 921: memory; 922: auxiliary storage device; 930: communication device; S100, S100a, S100b: three-dimensional map generation process

The invention claimed is:

1. A three-dimensional map generation system to generate three-dimensional map information representing a three-dimensional map for use in automated driving by using measured data acquired by a measurement vehicle moving in a measurement area, the three-dimensional map generation system comprising:
processing circuitry configured to
determine, from the measurement area, a data shortage area where measured data for generating the three-dimensional map is lacking or defective, based on first measured data transmitted from the measurement vehicle; and
determine the data shortage area as a defective area, and in response to determining the defective area, generate interpolated data of the defective area by interpolating the measured data, wherein
the processing circuitry is further configured to generate the interpolated data of the defective area by interpolating the measured data to generate a NURBS (Non-Uniform Rational B-Spline) curve representing a road so that a lateral G, which is centrifugal force in a lateral direction applied to a traveling vehicle traveling the road at a predetermined, constant traveling speed, is equal to or less than a predefined threshold.

2. The three-dimensional map generation system according to claim 1, wherein the processing circuitry is further configured to generate the interpolated data of the defective area by the NURBS curve so that the lateral $G=(V^2/R/g)\leq 0.5$ G, where the predetermined traveling speed is V, a radius of curvature of an arc part of the road is R, and an acceleration of gravity is g.

3. The three-dimensional map generation system according to claim 2, wherein the processing circuitry is further configured to generate the interpolated data of the defective area by the NURBS curve so that 0.2 G$\leq$the lateral $G=(V^2/R/g)\leq 0.3$ G.

4. The three-dimensional map generation system of claim 1, wherein the processing circuitry is further configured to generate the interpolated data by determining the NURBS curve, which extends from a first point of the measured data to a second point of the measured data.

5. A three-dimensional map generation method of a three-dimensional map generation system to generate three-dimensional map information representing a three-dimensional map for use in automated driving by using measured data acquired by a measurement vehicle moving in a measurement area, the three-dimensional map generation method comprising:

determining, from the measurement area, a data shortage area where measured data for generating the three-dimensional map is lacking or defective, based on first measured data transmitted from the measurement vehicle; and determining the data shortage area as a defective area, and in response to determining the defective area, generating interpolated data of the defective area by interpolating the measured data to generate a NURBS (Non-Uniform Rational B-Spline) curve representing a road so that a lateral G, which is centrifugal force in a lateral direction applied to a traveling vehicle traveling a road in the defective area at a predetermined, constant traveling speed, is equal to or less than a predefined threshold.

6. A non-transitory computer-readable medium storing a three-dimensional map generation program of a three-dimensional map generation system to generate three-dimensional map information representing a three-dimensional map for use in automated driving by using measured data acquired by a measurement vehicle moving in a measurement area, the three-dimensional map generation program causing a computer to execute:

a determination process of determining, from the measurement area, a data shortage area where measured data for generating the three-dimensional map is lacking or defective, based on first measured data transmitted from the measurement vehicle; and a generation process of determining the data shortage area as a defective area, and in response to determining the defective area, generating interpolated data of the defective area by interpolating the measured data to generate a NURBS (Non-Uniform Rational B-Spline) curve representing a road so that a lateral G, which is centrifugal force in a lateral direction applied to a traveling vehicle traveling the road in at a predetermined, constant traveling speed, is equal to or less than a predefined threshold.

\* \* \* \* \*